UNITED STATES PATENT OFFICE.

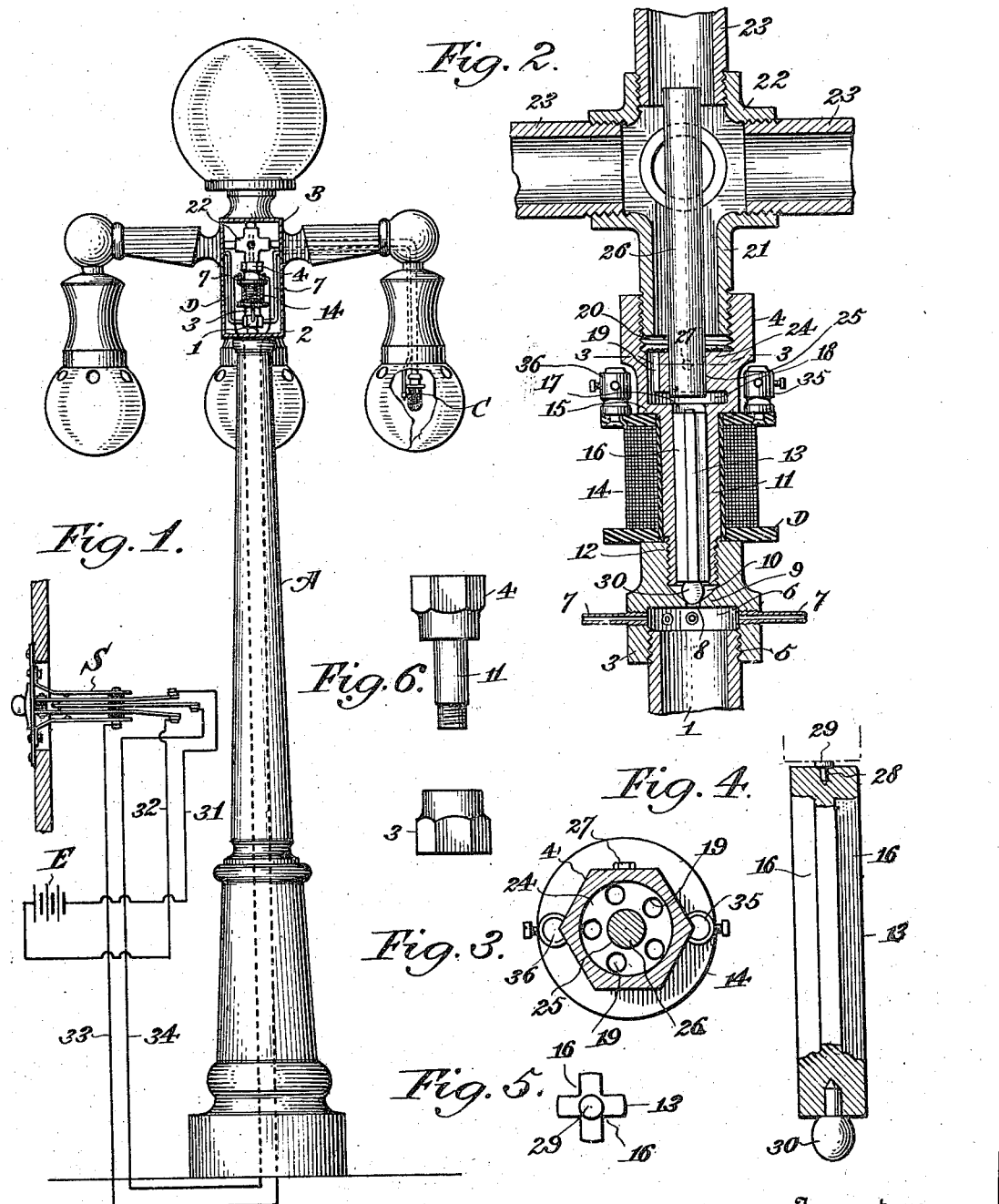

EDWARD E. BAIR AND JAMES E. STOUT, OF HANOVER, PENNSYLVANIA; SAID STOUT ASSIGNOR TO SAID BAIR.

ELECTROMAGNETIC VALVE FOR GAS-LIGHTING SYSTEMS.

1,268,913.  Specification of Letters Patent.  Patented June 11, 1918.

Application filed December 1, 1916. Serial No. 134,518.

*To all whom it may concern:*

Be it known that EDWARD E. BAIR and JAMES E. STOUT, citizens of the United States, residing at Hanover, in the county of York and State of Pennsylvania, have invented certain new and useful Improvements in Electromagnetic Valves for Gas-Lighting Systems, of which the following is a specification.

This invention relates to a system for lighting and extinguishing gas burners, or lamps, from a remote station, and has particular application to a system wherein a flow of gas to and from the burner is controlled and determined by valve mechanism which is electrically operated from such remote station to enable such burner to be ignited or extinguished at will.

In the present instance it is our purpose to provide a system of this character wherein an electromagnetic valve is employed which is so positioned as to control the flow of the gas from the gas main to the burner or burners, such valve being operated in turn through the agency of a pole-changing switch which may be located at a point or station distant from the burner.

A further object of the invention is the provision of a system of this character wherein the gas controlling valve is held in open position, to permit the flow of gas to the burner, by a permanent magnet, being moved to such position when an electric current is caused to flow in one direction through a solenoid structure connected to such valve, said valve being closed and seated by gravity, to cut off the flow of gas, when removed from the holding effect of the permanent magnet by causing a flow of electric current through the solenoid in the reverse direction, the changes in direction of current flow being provided by the manipulation of a suitable pole-changing switch which may be located at a distant station.

Another object of the invention is the provision of an electromagnetic valve including a solenoid having an armature constituting the valve stem and grooved to provide suitable gas passages, one end of said armature carrying a valve member or head which is self-seating and self-grinding, the opposite end of the armature being constructed so as to be readily responsive to the attractive force of the permanent magnet while preventing the armature itself from being permanently magnetized by such permanent magnet.

A further object of our invention is the provision of an electromagnetic valve which will embody the desired features of simplicity, efficiency and reliability, and which, embodying as it does but relatively few parts, may be readily assembled or installed, and may be manufactured and marketed at a comparatively low cost.

In actual practice it will of course be understood that these valves may be employed singly, or in series, to control the flow of gas to a burner, or to a plurality of burners; furthermore, such a valve may be employed in connection with a gas burner ignited through a pilot light, or in any other manner, and while we have in the present instance shown our invention as applied to a gas lamp ignited through a pilot, we wish it to be understood that we do not limit ourselves to such arrangement, and furthermore, the invention is not limited to all the precise details of construction herein set forth by way of illustration, as modification and variation may be made without departing from the spirit of the invention or exceeding the scope of the appended claims.

In the accompanying drawings:

Figure 1 is a diagrammatic sectional elevation of a post carrying a plurality of burners, the valve mechanism being arranged on said post and being shown in elevation. A pole changing switch is also shown in connection with the valve mechanism.

Fig. 2 is a central vertical sectional view of the valve mechanism.

Fig. 3 is a horizontal sectional view taken on the line 3—3, Fig. 2.

Fig. 4 is a detail sectional elevation of the armature and its attached parts.

Fig. 5 is a plan view thereof.

Fig. 6 is a view on a reduced scale illustrating details of the valve casing.

Referring now to the accompanying drawings in detail the letter A indicates a conventional form of lamp-post surmounted by a cluster lamp B, the individual burners of which are indicated at C. Through the post A extends the usual gas main 1, the upper end of which is connected with an electromagnetic valve indicated as an entirety by the letter D, and which is located in the case or boxing 2 of the cluster lamp. This valve D includes a two-part valve casing, that is to say, is formed of a lower member 3 and an upper member 4, these members being preferably formed of a suitable metal, such as brass. The lower member 3 is in the nature of a tubular coupling thimble which is threaded as at 5 onto the end of the gas main 1, thus forming a small gas chamber 6, from which lead the small pilot light pipes 7, and from this chamber a gas passage 8 leads through the diaphragm 9, which has its upper face recessed to provide the concave valve seat 10. This gas passage 8 provides a communication between the chamber 6 of the lower member 3 and the interior of sleeve 11 of the upper member 4, which sleeve is threaded to the lower member as at 12. Within this sleeve is located, and adapted to slide, the armature 13 of a solenoid, the coil of which is indicated at 14, the sleeve 11 extending through such coil, the latter being confined between the top of the lower member 3 of the valve casing and the shoulder 15 of the upper member 4 of the valve casing. This armature 13 is in the nature of a soft iron bar which is grooved or fluted longitudinally as at 16 so that gas passages are formed between the fluted sections of the armature and the wall of the bore 17, of the sleeve. In other words, the armature is more or less cruciform in cross section, a configuration which, in coöperation with the circular form of the inner periphery of sleeve 11, provides for maximum solenoidal action and at the same time producing passageways for the gas. The upper end of the sleeve bore 17 communicates with a gas chamber 18 in the member 4 and from which chamber the vertical ducts or gas passages 19 lead into the threaded bore 20 of the member 4 and into which is threaded the pipe section 21 of the cross coupling 22. From this cross coupling 22 branch gas pipes 23 lead to the various burners C. The small gas ducts or passages 19 are formed in the web 24 of the upper valve casing 4, and this web is provided with a central bore 25 through which extends the lower portion of a permanent bar magnet 26, a set screw 27 being provided for adjustably securing the permanent magnet to the web so that the magnet may be raised and lowered vertically, or adjusted as will be evident. By reference to Fig. 2 it will be seen that the lower end of this permanent magnet terminates adjacent the upper end of the flute armature 13 of the solenoid and materially beyond the plane of the coil 14, the arrangement being such that the permanent magnet is ineffective to move the valve from its seat and at the same time is free from demagnetizing effect of the coil. The upper end of this armature has embedded therein a pin 28 having a copper disk-like head 29, and as will be understood by reference to Fig. 4, when the armature is attracted by the permanent magnet, as hereinafter described, it is this copper head 29 which will contact with the bottom face of the magnet, the top face of the armature being slightly spaced from such permanent magnet. Thus the iron portion of the armature is not permitted to contact with the permanent magnet, eliminating the possibility of the armature being permanently magnetized, while at the same time this iron portion is close enough to the permanent magnet to provide an armature sustaining effect of sufficient extent to retain the valve open under ordinary conditions and in the absence of an action counter to the action of the permanent magnet. The lower end of this armature 13 has depending therefrom a ball valve member or head 30, which is adapted to rest upon the seat 10 and close the gas passage 8 when the armature is free from influence of the permanent magnet, the gravitation of the armature toward the valve seat causing the ball member of the valve to fit snugly upon the seat and positively seal the gas passage 8, thereby shutting off the flow of the gas from the main 1 through such passage 8 and thus on to the burners.

As will be seen, the length of travel of the armature is relatively small, while the armature is of considerable length—exceeding the axial length of the coil. Hence, the length of movement of the armature, under gravitation, is not such as would tend to batter or otherwise affect the valve seat, although the armature weight is such as to insure a quick movement of the armature under gravity and against the gas pressure.

It will also be seen that the position of the parts is such that the length of armature movement is so limited as to prevent its reaching a point of equilibrium under the magnetizing effect of the coil when energized.

Hence the action of the coil in releasing the armature from its magnet-held position is simply to produce the proper polarity of the armature end which opposes the end of the permanent magnet.

The electric current for the solenoid may be furnished from any suitable battery such as is shown at E, which is connected in circuit with the pole changing switch S through the battery wires 31 and 32, circuit wires 33 and 34 connecting such pole changing switch in circuit with the solenoid coil through the binding posts 35 and 36. While the pole changing switch S and the wiring of the system may be of any suitable character, we have shown herein a switch such as forms the subject matter of our co-pending application, Ser. No. 134517, filed Dec. 1, 1916.

From the above description, taken in connection with the accompanying drawings, the construction and operation of our invention will be readily understood.

Assuming the valve to be closed, with the ball valve member 30 resting upon its seat, as shown in Fig. 2, if it is desired to permit the gas to pass from the main 1 to the burners, the pole changing switch S is moved in the proper direction to cause the current from the battery E to flow through the solenoid coil 14 in the proper direction to produce a polarity at the upper end of the solenoid of opposite sign to that of the permanent magnet, energizing of the coil causing the soft iron grooved armature to immediately attempt to place itself central to the lines of force exerted by the electromagnetic current, thereby moving the armature toward and bringing head 29 into contact with the permanent magnet, as indicated in Fig. 4, this upward movement of the armature of course withdrawing the ball valve member 30 from its seat. When the circuit through the coil is broken at the switch S, the armature will be held in its lifted position by the action of the permanent magnet. This movement of the armature permits the gas to flow through the passage 8, through the fluted or grooved sections of the armature, thence through the gas ducts 19 into the tubular cross coupling 22, and then through the branch pipes 23 to the burners where the gas will be ignited by the pilot lights, which are of course continuously supplied with gas through the small branch pipes 7. The gas will continue to flow indefinitely or until the switch is again operated to close the valve. To accomplish this closing of the valve the pole changing switch is moved to reverse the direction of current flow through the coil, thus producing a polarity at the upper end of the armature of like sign to that of the permanent magnet, causing a repelling action between the permanent magnet and armature of sufficient extent to force the armature from the permanent magnet whereupon such armature will instantly drop by gravity, thus seating the ball valve member 30 and immediately shutting off the gas. It will be readily understood, therefore, that manipulation of switch S in the proper direction will cause the armature either to open or to close the valve, it being necessary simply to hold the switch in position a length of time sufficient to cause the armature movements. Since the valve closes by gravity, it will be understood that through any disarrangement of parts or ineffectiveness in operation, preventing the armature from retaining its open position, the gas valve will be automatically and positively closed.

The shape of the valve head 30 is such that any wear which results will take place evenly so that the valve may be said to be, to all intents and purposes, self-seating and self-grinding As will be seen, the valve structure not only is of few parts and readily assembled, but the general arrangement is such as to provide efficient operation at low cost.

What we claim is:

1. In means for controlling the flow of gas, a valve structure located in and forming a portion of the gas conduit, and electromagnetic means for controlling valve movements, said valve structure including a pair of members threaded together and combinedly providing a pair of external shoulders between which the coil of the magnet is positioned, said shoulders being carried by the respective members to permit ready assemblage of the coil relative to the valve structure, one of said members carrying a valve seat, an armature extending axially of said members and carrying the valve member coöperating with respect to said seat, said armature extending permanently within the planes of the coil, and a permanent magnet carried by the other member in axial alinement with the armature, said members having formations adapted to permit of passage of gas therethrough when the armature has been moved to open the valve.

2. In means for controlling the flow of gas, a valve structure located in and forming a portion of the gas conduit, and electromagnetic means for controlling valve movements, said valve structure including a pair of members threaded together and combinedly providing a pair of external shoulders between which the coil of the magnet is positioned, said shoulders being carried by the respective members to permit ready assemblage of the coil relative to the valve structure, one of said members carrying a valve seat, an armature extending axially of said members and carrying the valve member coöperating with respect to said seat, said armature extending permanently within the planes of the coil, and a permanent magnet carried by the other member in axial alinement with the armature, said members having formations adapted to permit of passage of gas therethrough when the armature has been moved to open the valve, said electro-magnetic means including a control structure for reversing the direction of current flow through the magnet coil at will.

3. In means for controlling the flow of gas to a burner and wherein gas ignition is provided by a pilot, a valve structure located in and forming a portion of the gas conduit, and electro-magnetic means for controlling valve movements, said valve structure including a pair of members threaded together and adapted to form a seat for a magnet coil of the magnetic means, one of said members carrying a valve seat and also carrying a port operatively connected to the pilot, an armature extending axially of said members and carrying the valve member complemental to said seat, and a permanent magnet carried by the other member in axial alinement with the armature, said permanent magnet being positioned to coöperate with the end of the armature opposite the end carrying the valve, said members having formations adapted to permit of passage of gas therethrough without affecting pilot operations when the armature has been moved to open the valve.

4. In means for controlling the flow of gas, a valve structure located in and forming a portion of the gas conduit, and electromagnetic means for controlling valve movements, said valve structure including a pair of members threaded together and combinedly providing a pair of external shoulders between which the coil of the magnet is positioned, said shoulders being carried by the respective members to permit ready assemblage of the coil relative to the valve structure, one of said members carrying a valve seat, an armature extending axially of said members and carrying the valve member coöperating with respect to said seat, said armature extending permanently within the planes of the coil, and a permanent magnet carried by the other member in axial alinement with the armature, said members having formations adapted to permit of passage of gas therethrough when the armature has been moved to open the valve, said armature having a cruciform configuration in cross-section.

5. In means for controlling the flow of gas, a valve structure located in and forming a portion of the gas conduit, and electromagnetic means for controlling valve movements, said valve structure including a pair of members threaded together and combinedly providing a pair of external shoulders between which the coil of the magnet is positioned, said shoulders being carried by the respective members to permit ready assemblage of the coil relative to the valve structure, one of said members carrying a valve seat, an armature extending axially of said members and carrying the valve member coöperating with respect to said seat, said armature extending permanently within the planes of the coil, and a permanent magnet carried by the other member in axial alinement with the armature, said members having formations adapted to permit of passage of gas therethrough when the armature has been moved to open the valve, said armature carrying a non-magnetic member at its end opposite the valve-carrying end, said non-magnetic member being adapted to space the magnetic portion of the armature from the permanent magnet during activity of the latter.

6. In means for controlling the flow of gas, a valve structure located in and forming a portion of the gas conduit, and electromagnetic means for controlling valve movements, said valve structure including a pair of members threaded together to form a seat for a magnet coil of the magnetic means, one of said members carrying a valve seat, the other of said members extending axially of the coil and having an inwardly extending flanged portion, a permanent magnet carried by said flanged portion, the latter being perforated independent of the permanent magnet seat to permit passage of gas from one side to the other of the flanged portion, and an armature extending axially of the permanent magnet carrying member and having a valve at its lower end coöperating with said seat, said members having formations adapted to permit of passage of gas therethrough when the armature has been moved to open the valve.

In testimony whereof we affix our signatures in the presence of two witnesses.

EDWARD E. BAIR.
JAMES E. STOUT.

Witnesses:
A. C. SCHWARTZ,
E. B. KUMP.

Copies of this patent may be obtained for five cents each, by addressing the "Commissioner of Patents, Washington, D. C."